United States Patent Office 3,483,201
Patented Dec. 9, 1969

3,483,201
PYRIDAZONE DERIVATIVES
Franz Reicheneder, Ludwigshafen (Rhine), and Adolf Fischer, Mutterstadt, Pfalz, Germany, assignors to Badische Anilin- & Soda-Fabrik Aktiengesellschaft, Ludwigshafen (Rhine), Germany
No Drawing. Filed Dec. 5, 1966, Ser. No. 598,963
Claims priority, application Germany, Jan. 7, 1966,
B 85,306
Int. Cl. C07d 51/04; A01n 9/22
U.S. Cl. 260—250                             3 Claims

ABSTRACT OF THE DISCLOSURE

Novel pyridazone derivatives having the formula

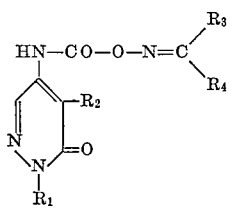

in which $R^1$ is phenyl, phenyl substituted by lower alkyl or halogen, cycloalkyl of 5 to 8 carbon atoms, and cycloalkyl substituted by lower alkyl or halogen, $R^2$ is halogen, $R^3$ is hydrogen, lower alkyl or phenyl, $R^4$ is alkyl of 1 to 4 carbon atoms, phenyl, halogen substituted phenyl, and $R^3$ and $R^4$ together with a carbon whose substituents they are may denote a cycloalkyl of 6 to 8 carbon atoms. The novel pyridazone derivatives have been found to have excellent herbicidal properties.

---

The present invention relates to new pyridazone derivatives. In particular it relates to new pyridazone/carbamic acid derivatives. The invention also relates to methods for controlling unwanted plants with said derivatives.

It is known that 1-phenyl-4-amino-5-chloropyridazone-(6) may be used as the active ingredient of a selective herbicide (Canadian patent specification No. 677,143). It is also known that 2-chloro-4,6-bis-(ethylamino)-s-triazine may be used as the active ingredient of a total herbicide (U.S. patent specification No. 2,891,855). However their action is not satisfactory.

We have found that pyridazones having the formula

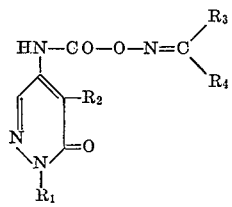

in which $R^1$ is a phenyl or cycloalkyl radical which may be substituted by alkyl or halogen, $R^2$ denotes halogen, $R^3$ denotes hydrogen, and alkyl or phenyl radical, $R^4$ denotes an alkyl radical or a phenyl radical which may be substituted by halogen and $R^3$ and $R^4$ together with the carbon whose substituents they are may denote a cycloalkyl radical have a good herbicidal action.

The pyridazones to be used according to the invention may be simply obtained by reacting the appropriate pyridazone isocyanate with an oxime. For example O-(1-phenyl-5-chloropyridazon-6-yl-4-carbamoyl) acetone oxime may be obtained by reacting 1-phenyl-4-isocyanato-5-chloropyridazone-(6) with acetone oxime in benzene solution. Since all the other compounds to be used according to the invention may be prepared by analogous methods the production of O-(1-phenyl-5-chloropyridazon-6-yl-4-carbamoyl) acetone oxime is described below in more detail.

100 parts (by weight) of 1-phenyl-4-amino-5-chloropyridazone-(6) is suspended in 1,000 parts of chlorobenzene. Hydrogen chloride (gas) and then phosgene are passed into the suspension which is heated to 130° C. As soon as there is a clear solution the introduction of phosgene is stopped. The solution is evaporated and cooled. 110 parts of 1-phenyl-4-isocyanate-5-chloropyridazone-(6) is obtained with a melting point of 154° to 155° C. (recrystallized from acetonitrile).

12 parts of 1-phenyl-4-isocyanato-5-chloropyridazone-(6) is dissolved in 50 parts of benzene and 3.6 parts of acetone oxime is added to the solution. After the solution has been boiled under reflux for ten minutes and cooled, 10 parts of O-(1-phenyl-5-chloropyridazon-6-yl-4-carbamoyl) acetone oxime is obtained with a melting point of 148° to 149° C.

The following compounds are examples of suitable agents for controlling plant growth according to the invention:

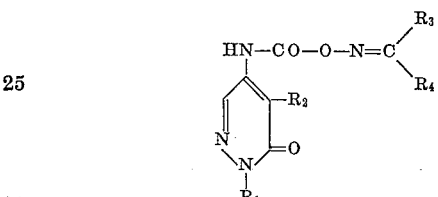

| $R_1$ | $R_2$ | $=C<^{R_3}_{R_4}$ | M.P. |
|---|---|---|---|
| phenyl | Cl | $=C<^{CH_3}_{CH_3}$ | 148° to 149°. C. |
| phenyl | Cl | =⟨H⟩ | 125° to 127° C. |
| phenyl | Cl | =⟨H⟩ | 125° C. |
| phenyl | Br | =CH—⟨Cl⟩ | 159° to 160° C. (with decomposition). |
| phenyl | Cl | =CH—C₄H₉ | 139° to 139.5° C. |

The agents for regulating plant growth according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points, such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. Compounds having adequate basicity may be used as salts in aqueous solution even after formation of the salt.

Dusts may be prepared by mixing or grinding the active ingredients with a solid carrier.

The following comparative experiments demonstrate the superiority of the compositions according to this invention over known active ingredients.

EXAMPLE 1

In a greenhouse plastics pots with a diameter of 8 cm. are filled with loamy sandy soil and seeds of beet (Beta vulgaris), Indian corn (Zea mays), barley (Hordeum vulgare), peas (Pisum sativum), wild mustard (Sinapis arvensis), chickweed (Stellaria media), white goosefoot (Chenopodium album), small nettle (Urtica urens) and annual meadow grass (Poa annua) are sown therein. The soil prepared in this way is then treated with 2 kg./ha. of O-(1-phenyl-5-chloropyridazon-6-yl-4-carbamoyl) acetone oxime (I) and, for comparison, with 2 kg./ha. of 1-phenyl-4-amino-5-chloropyridazone-(6), each dispersed in 500 liters of water per hectare. Four to five weeks later it can be observed that I has a stronger herbicidal action than II. The herbicidal action can be seen from the following table.

|  | Active ingredient | |
| --- | --- | --- |
|  | I | II |
| Crop plants: |  |  |
| Beet | 0 | 0 |
| Indian corn | 0 | 10 |
| Barley | 0 | 20 |
| Peas | 0 | 10 |
| Unwanted plants: |  |  |
| Wild mustard | 100 | 90 |
| Chickweed | 90–100 | 80–90 |
| White goosefoot | 90–100 | 80–90 |
| Small nettle | 100 | 90 |
| Annual meadow grass | 100 | 80–90 |

0=no damage; 100=total destruction.

The following compounds have the same biological action as I in Examples 1, 2, 3 and 4:

O-(1-p-fluorophenyl-5-bromopyridazone-6-yl-4-carbamoyl) acetone oxime

O-(1-cyclohexyl-5-iodopyridazone-6-yl-4-carbamoyl) benzophenoxime

O-(1-cyclopentyl-5-chloropyridazone-6-yl-4-carbamoyl) acetophenoxime

O-(1-cyclooctyl-4-chloropyridazone-6-yl-4-carbamoyl) methylethyl ketone oxime

O-(1-cyclooctyl-5-bromopyridazone-6-yl-4-carbamoyl) cyclohexanone oxime

O-(1-p-methyl-cyclohexyl-5-bromopyridazone-6-yl-4-carbamoyl) cyclo-octanone oxime O-(1-p-chlorophenyl-5-fluoropyridazone-6-yl-4-carbamoyl) acetaldoxime O-(1-p-bromophenyl-5-iodopyridazone-6-yl-4-carbamoyl)-benzaldoxime.

EXAMPLE 2

In a greenhouse the plants beet (Beta vulgaris), Indian corn (Zea mays), barley (Hordeum vulgare), peas (Pisum sativum), wild mustard (Sinapis arvensis), chickweed (Stellaria media), white goosefoot (Chenopodium album), small nettle (Urtica urens) and annual meadow grass (Poa annua) are treated at a growth height of 3 to 15 cm. with 2 kg./ha. of O-(1-phenyl-5-chloropyridazon-6-yl-4-carbamoyl) acetone oxime (I) and, for comparison, with 2 kg./ha. of 1-phenyl-4-amino-5-chloropyridazone-(6) (II), each dispersed in 500 liters of water per hectare. Three to four weeks later it is observed that I has a stronger herbicidal action than II. The herbicidal action can be seen from the following table.

|  | Active ingredient | |
| --- | --- | --- |
|  | I | II |
| Crop plants: |  |  |
| Beet | 0 | 0 |
| Indian corn | 0 | 10 |
| Barley | 0 | 20–30 |
| Peas | 0–10 | 10–20 |
| Unwanted plants: |  |  |
| Wild mustard | 100 | 80–90 |
| Chickweed | 100 | 80 |
| White goosefoot | 100 | 90 |
| Small nettle | 100 | 90–100 |
| Annual meadow grass | 90–100 | 70–80 |

0=no damage; 100=total destruction.

EXAMPLE 3

An experimental area which is sown with wild mustard (Sinapis arvensis), chickweed (Stellaria media), white goosefoot (Chenopodium album), small nettle (Urtica urens) and annual meadow grass (Poa annua) is sprayed on the day of sowing with O-(1-phenyl-5-chloropyridazon-6-yl-4-carbamoyl) acetone oxime and, for comparison, with 2-chloro-4,6-bis-(ethylamino)-s-triazine (II) each at a rate of 5 kg./ha. dispersed in 500 liters of water per hectare. Three to four weeks later it is observed that the active ingredient I has completely destroyed the broad-leaved and grass weeds, whereas in the case of active ingredient I not all the weeds have withered.

EXAMPLE 4

An agricultural cultivated area which is overgrown with wild mustard (Sinapis arvensis), chickweed (Stellaria media), white goosefoot (Chenopodium album), small nettle (Urtica urens) and annual meadow grass (Poa annua) is sprayed at a growth height of the weeds of 3 to 8 cm. with O-(1-phenyl-5-chloropyridazon-6-yl-4-carbamoyl) acetone oxime (I) and, for comparison, with 2-chloro-4,6-bis-(ethylamino)-s-triazine (II), each at a rate of 5 kg./ha. of active ingredient dispersed in 500 liters of water per hectare. Eight days later the broad-leaved and grass weeds treated with the active ingredient I exhibit considerable damage, whereas the plants sprayed with II still exhibit normal growth. Three weeks later almost all the plants are completely withered.

We claim:

1. O - (1 - phenyl - 5 - chloropyridazon - 6 - yl - 4-carbamoyl) acetone oxime.

2. O - (1 - cyclohexyl - 5 - iodopyridazon - 6 - yl - 4-carbamoyl) benzophenoxime.

3. A compound having the formula

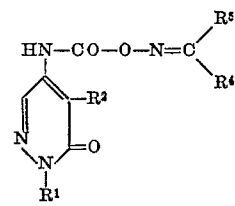

in which $R^1$ is phenyl, phenyl substituted by lower alkyl or halogen, cycloalkyl of 5 to 8 carbon atoms, and cycloalkyl of 5 to 8 ring carbon atoms substituted by lower alkyl, chloro or bromo, $R^2$ is chloro or bromo, $R^3$ is hydrogen, lower alkyl or phenyl, $R^4$ is alkyl of 1 to 4 carbon atoms, phenyl, halogen substituted phenyl, and $R^3$ and $R^4$ together with a carbon whose substituents they are may denote a cycloalkyl of 6 to 8 carbon atoms.

References Cited

UNITED STATES PATENTS 3,222,159   12/1965   Reicheneder et al.

NICHOLAS S. RIZZO, Primary Examiner

U.S. Cl. X.R.

71—92